US011352039B1

(12) United States Patent
Milam

(10) Patent No.: US 11,352,039 B1
(45) Date of Patent: Jun. 7, 2022

(54) SHOPPING CART SECURITY SYSTEM

(71) Applicant: Tyler Milam, Southwest Ranches, FL (US)

(72) Inventor: Tyler Milam, Southwest Ranches, FL (US)

( * ) Notice: Subject to any disclaimer, the term of this patent is extended or adjusted under 35 U.S.C. 154(b) by 30 days.

(21) Appl. No.: 16/877,594

(22) Filed: May 19, 2020

(51) Int. Cl.
| | |
|---|---|
| *H02S 10/40* | (2014.01) |
| *B62B 5/04* | (2006.01) |
| *G01S 19/42* | (2010.01) |
| *B62B 3/14* | (2006.01) |
| *F21V 23/00* | (2015.01) |
| *F21S 43/14* | (2018.01) |
| *G08B 13/02* | (2006.01) |
| *F21S 9/03* | (2006.01) |
| *B60B 33/00* | (2006.01) |
| *H05B 45/10* | (2020.01) |
| *B60B 7/00* | (2006.01) |

(Continued)

(52) U.S. Cl.
CPC ............ *B62B 5/0423* (2013.01); *B60B 7/006* (2013.01); *B60B 33/0094* (2013.01); *B62B 3/1408* (2013.01); *B62B 3/1472* (2013.01); *B62B 3/1492* (2013.01); *F21S 9/032* (2013.01); *F21S 43/14* (2018.01); *F21V 23/003* (2013.01); *G01S 19/42* (2013.01); *G08B 13/02* (2013.01); *H02S 10/40* (2014.12); *H05B 45/10* (2020.01); *F21W 2107/10* (2018.01); *F21Y 2105/18* (2016.08); *F21Y 2115/10* (2016.08); *H02S 40/38* (2014.12)

(58) Field of Classification Search
CPC .......... H02S 10/40; H02S 40/38; F21S 43/14; F21S 9/032; H05B 45/10; B60B 7/006; B60B 33/0094; B60B 33/0092; B62B 3/1408; B62B 3/1472; B62B 3/1492; B62B 5/0423; F21V 23/003; G01S 19/42; G08B 13/02; F21Y 2105/18; F21Y 2115/10; F21W 2107/10
See application file for complete search history.

(56) References Cited

U.S. PATENT DOCUMENTS

| | | | |
|---|---|---|---|
| 4,199,043 A | * | 4/1980 | Lankester ............. B60B 33/021 188/111 |
| 4,591,175 A | | 5/1986 | Upton |

(Continued)

FOREIGN PATENT DOCUMENTS

| | | | | |
|---|---|---|---|---|
| CN | 109917281 A | * | 6/2019 | |
| DE | 102007052946 A1 | * | 4/2009 | ......... G08B 13/2454 |

(Continued)

*Primary Examiner* — James A Shriver, II
*Assistant Examiner* — Michael T. Walsh

(57) ABSTRACT

The shopping cart security system is configured for use with a hand propelled vehicle known as a shopping cart. The shopping cart security system is a wheeled structure that allows the hand propelled vehicle to roll over a supporting surface. The shopping cart security system: a) determines the GPS coordinates of the shopping cart security system; b) compares the GPS coordinates of the shopping cart security system with a previously determined set of GPS coordinates that determine an operating perimeter for the shopping cart security system; and, c) disables the rotation of the wheeled structure that forms the shopping cart security system when the shopping cart security system is determined to be outside of the region bounded by the previously determined operating perimeter.

14 Claims, 6 Drawing Sheets

(51) Int. Cl.
*F21Y 105/18* (2016.01)
*H02S 40/38* (2014.01)
*F21Y 115/10* (2016.01)
*F21W 107/10* (2018.01)

(56) References Cited

U.S. PATENT DOCUMENTS

| | | | | |
|---|---|---|---|---|
| 4,772,880 A | * | 9/1988 | Goldstein | B62B 5/0423 |
| | | | | 280/33.994 |
| 4,897,633 A | * | 1/1990 | Kuwano | B60Q 3/16 |
| | | | | 200/313 |
| 5,194,844 A | * | 3/1993 | Zelda | B62B 5/0423 |
| | | | | 180/167 |
| 5,552,972 A | * | 9/1996 | Rezvani | A63C 17/24 |
| | | | | 280/11.203 |
| 5,810,450 A | * | 9/1998 | Tsu | H04M 1/715 |
| | | | | 301/5.301 |
| 5,823,302 A | * | 10/1998 | Schweninger | B60T 7/18 |
| | | | | 188/111 |
| 5,881,846 A | | 3/1999 | French | |
| 5,940,932 A | * | 8/1999 | LaHay | B60B 33/0063 |
| | | | | 16/30 |
| 5,957,541 A | * | 9/1999 | Seigler | B60Q 1/326 |
| | | | | 301/5.301 |
| 6,173,817 B1 | * | 1/2001 | Gray | B62B 5/0423 |
| | | | | 188/1.12 |
| 7,420,461 B2 | | 9/2008 | Nebolon | |
| 9,610,965 B2 | | 4/2017 | Khuu | |
| 9,669,659 B2 | | 6/2017 | McKay | |
| 10,196,040 B2 | | 2/2019 | Carter | |
| 2008/0001467 A1 | * | 1/2008 | Gilly | B60B 7/20 |
| | | | | 301/37.25 |
| 2008/0074260 A1 | * | 3/2008 | Reiner | B60R 25/09 |
| | | | | 340/568.5 |
| 2008/0158013 A1 | * | 7/2008 | Nebolon | B62B 5/0423 |
| | | | | 340/988 |
| 2008/0303717 A1 | * | 12/2008 | Durban | G01S 1/44 |
| | | | | 342/371 |
| 2014/0375007 A1 | * | 12/2014 | Fissell | F21V 33/008 |
| | | | | 280/87.042 |
| 2017/0007910 A1 | * | 1/2017 | Ruschkowski | A63C 17/12 |
| 2017/0066464 A1 | * | 3/2017 | Carter | G01S 5/14 |
| 2017/0225701 A1 | * | 8/2017 | Kraus | B62B 3/14 |

FOREIGN PATENT DOCUMENTS

| | | | | |
|---|---|---|---|---|
| GB | 2484033 A | * | 3/2012 | A63C 17/223 |
| WO | WO-2006102561 A2 | * | 9/2006 | G08B 13/2434 |
| WO | 2008082702 | | 7/2008 | |

* cited by examiner

SHOPPING CART SECURITY SYSTEM

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of hand propelled vehicles and carts, more specifically, a locking mechanism that prevents the movement of a cart. (B62B5/04)

SUMMARY OF INVENTION

The shopping cart security system is configured for use with a hand propelled vehicle known as a shopping cart. The shopping cart security system is a wheeled structure that allows the hand propelled vehicle to roll over a supporting surface. The shopping cart security system: a) determines the GPS coordinates of the shopping cart security system; b) compares the GPS coordinates of the shopping cart security system with a previously determined set of GPS coordinates that determine an operating perimeter for the shopping cart security system; and, c) disables the rotation of the wheeled structure that forms the shopping cart security system when the shopping cart security system is determined to be outside of the region bounded by the previously determined operating perimeter. The shopping cart security system comprises a caster and a control circuit. The control circuit mounts in the caster.

These together with additional objects, features, and advantages of the shopping cart security system will be readily apparent to those of ordinary skill in the art upon reading the following detailed description of the presently preferred, but nonetheless illustrative, embodiments when taken in conjunction with the accompanying drawings.

In this respect, before explaining the current embodiments of the shopping cart security system in detail, it is to be understood that the shopping cart security system is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the shopping cart security system.

It is therefore important that the claims be regarded as including such equivalent construction insofar as they do not depart from the spirit and scope of the shopping cart security system. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
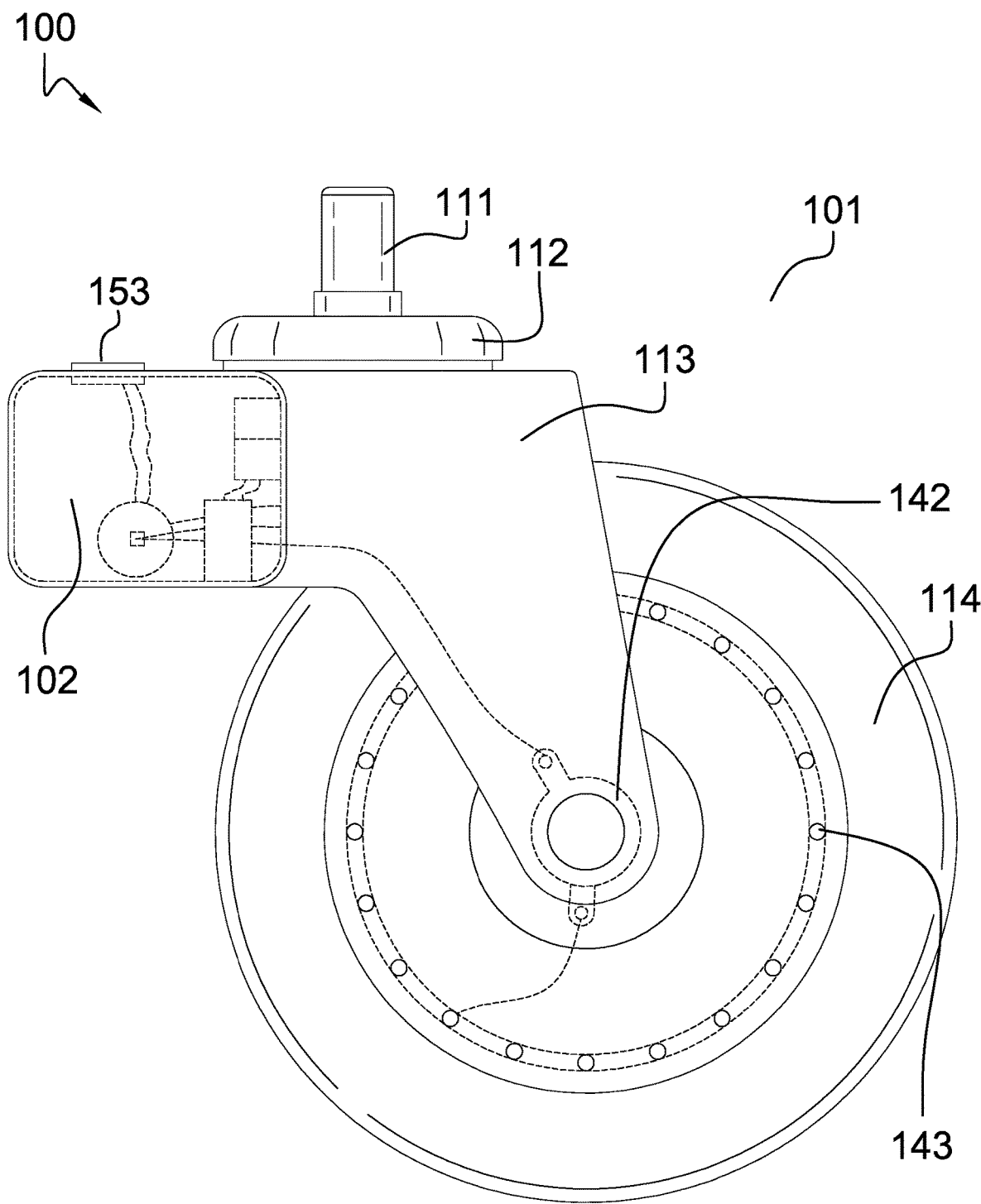
FIG. 1 is a front view of an embodiment of the disclosure.
Figure 2:
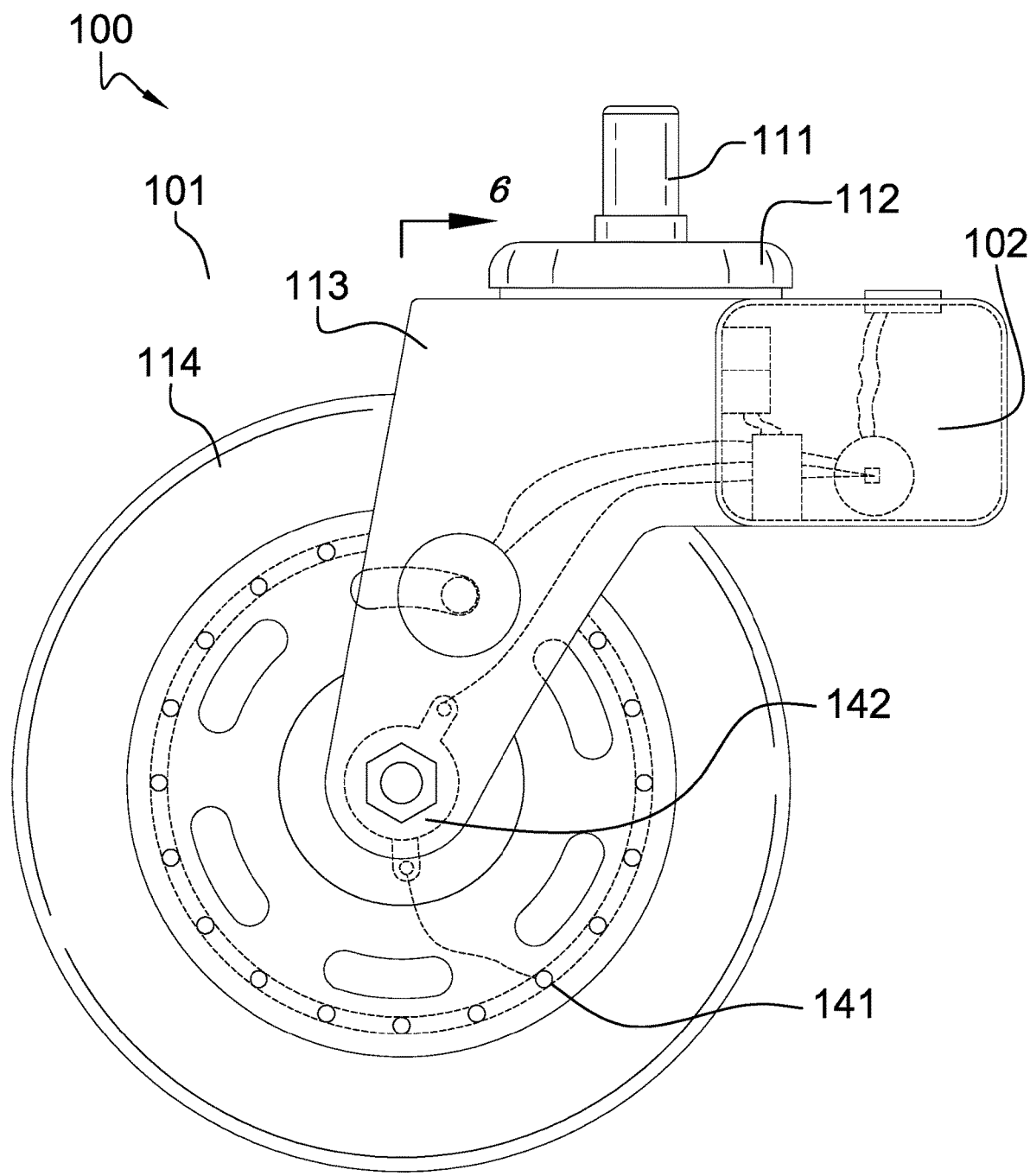
FIG. 2 is a rear view of an embodiment of the disclosure.
Figure 3:
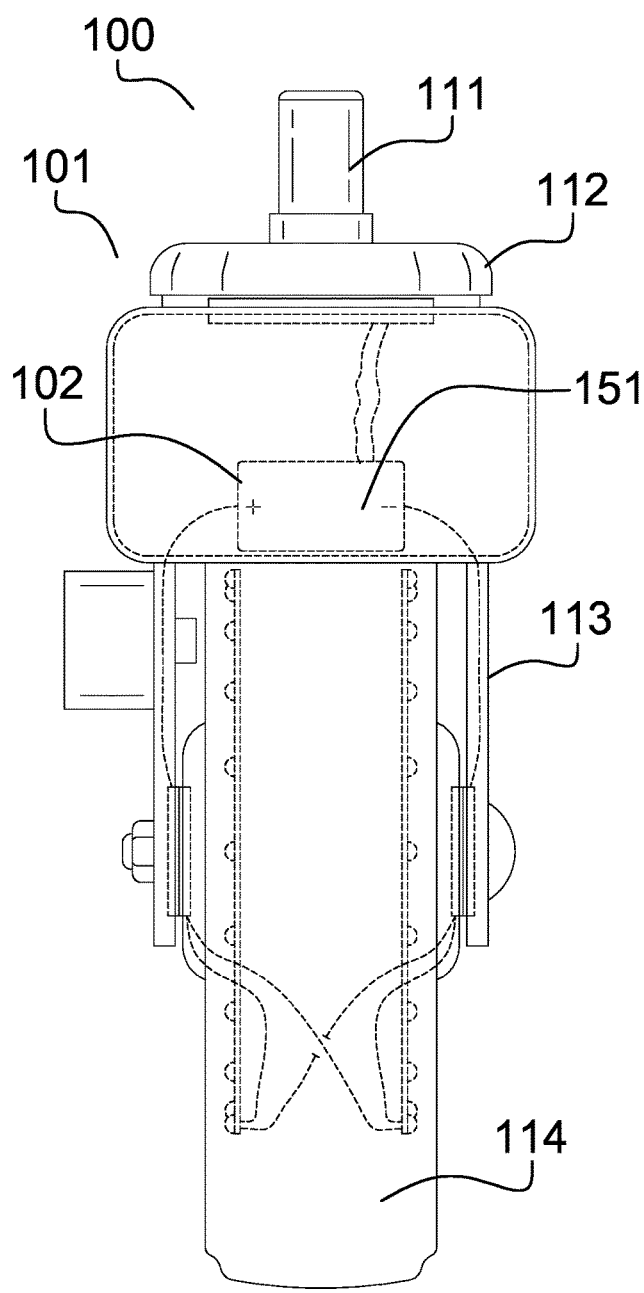
FIG. 3 is a side view of an embodiment of the disclosure.
Figure 4:
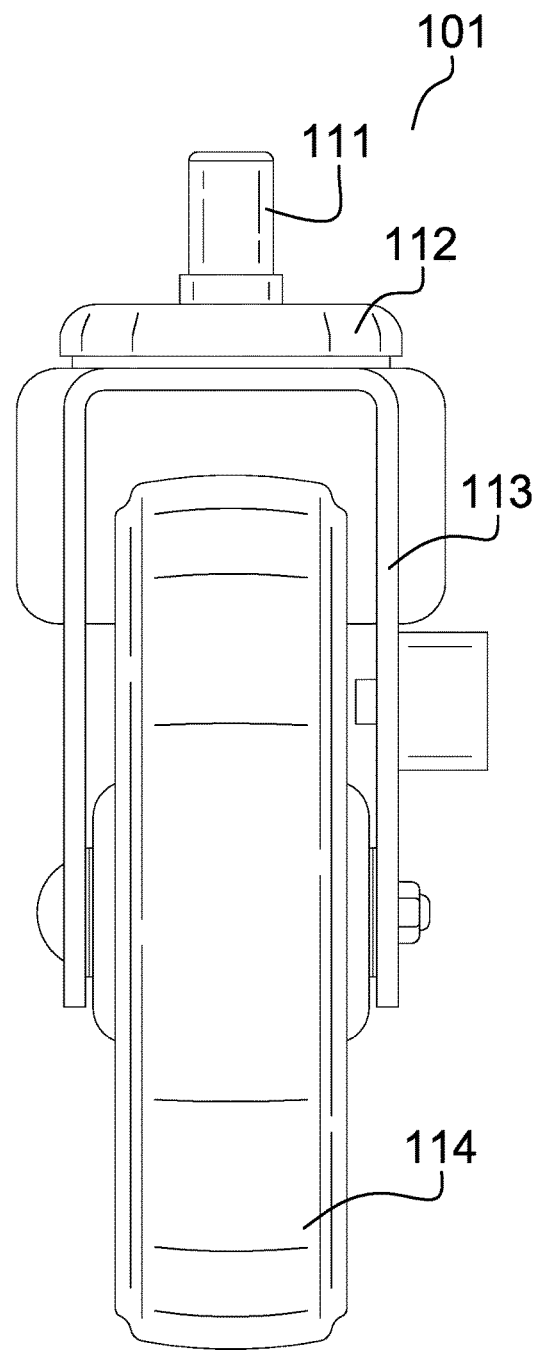
FIG. 4 is a reverse side view of an embodiment of the disclosure.
Figure 5:
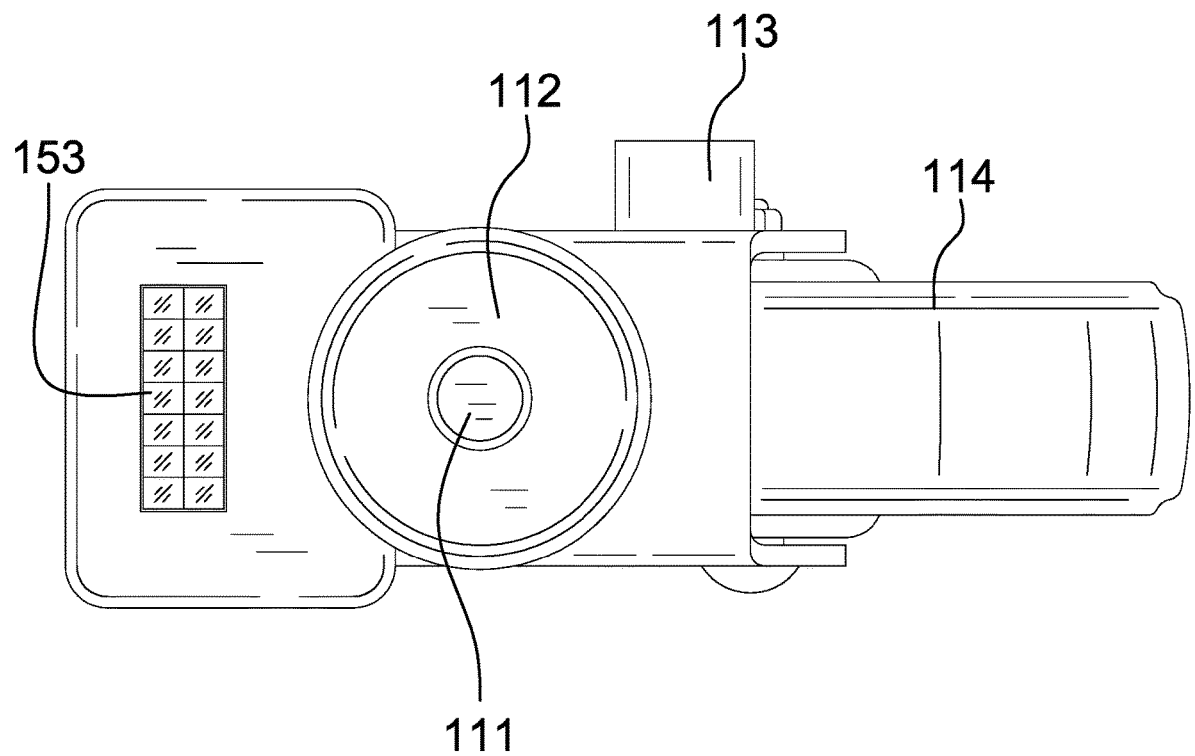
FIG. 5 is a top view of an embodiment of the disclosure.
Figure 6:
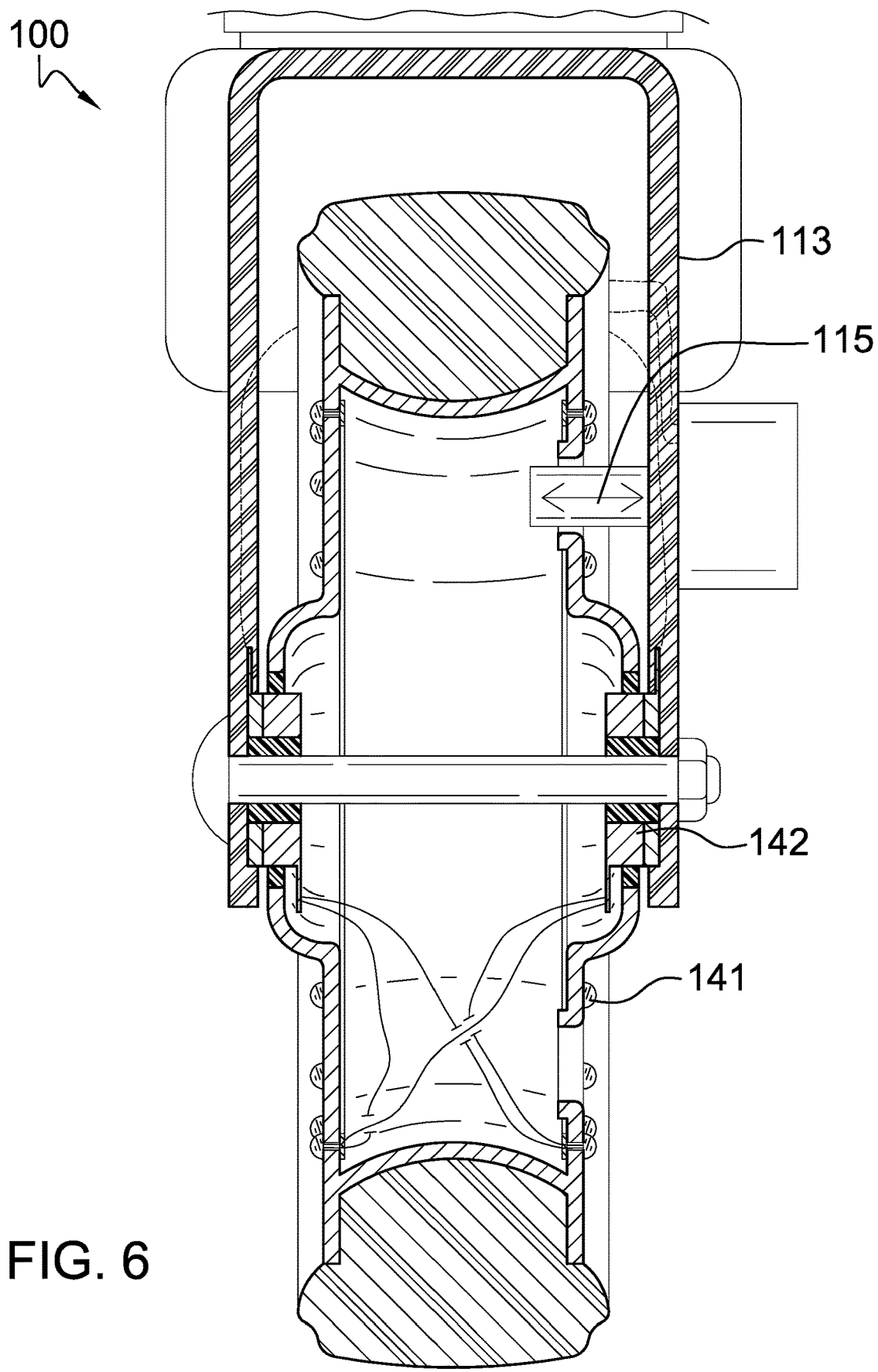
FIG. 6 is a cross-sectional view of an embodiment of the disclosure across 6-6 as shown in FIG. 2.
Figure 7:
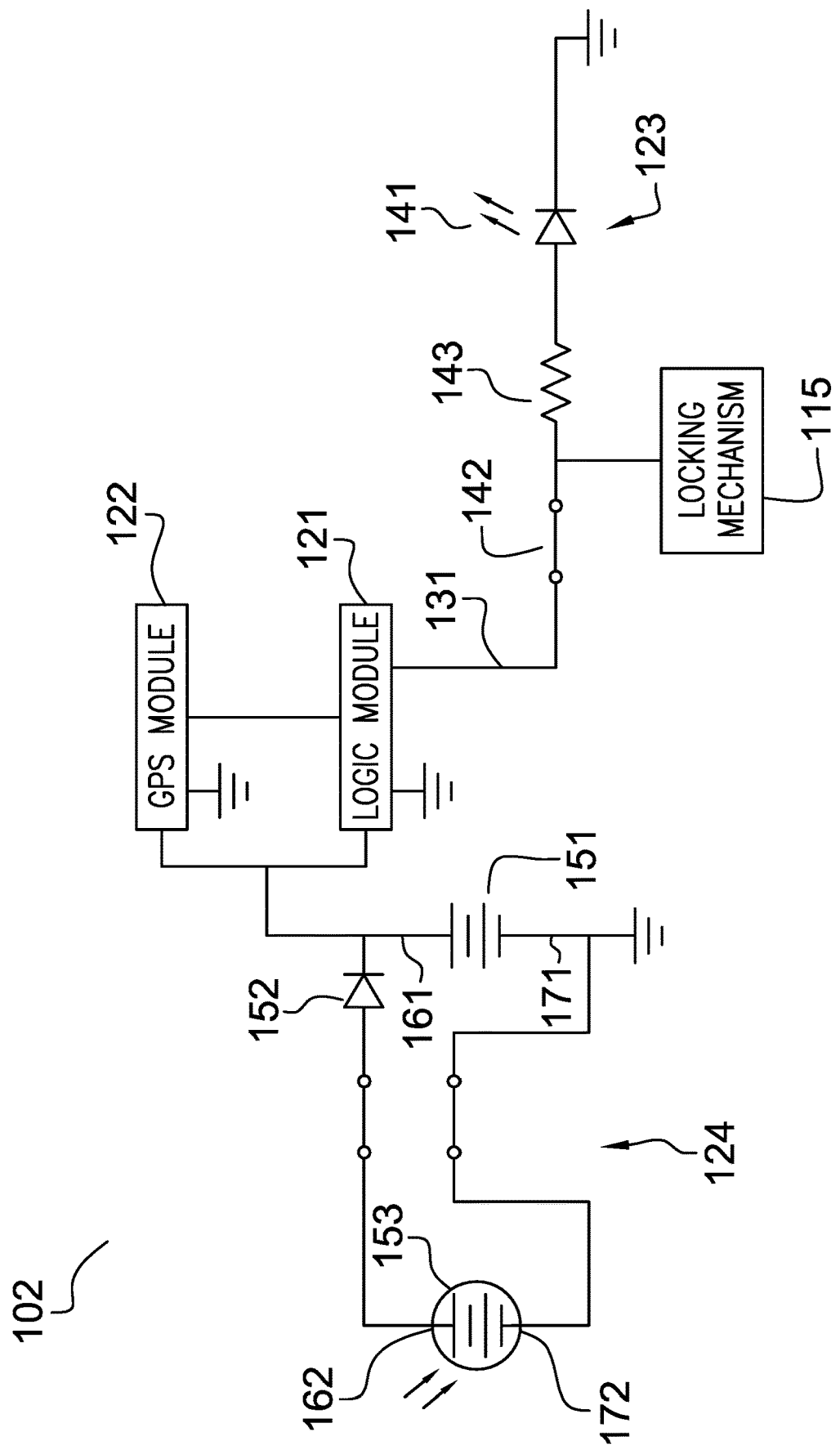
FIG. 7 is a schematic view of an embodiment of the disclosure.

Detailed reference will now be made to one or more potential embodiments of the disclosure, which are illustrated in FIGS. 1 through 7.

The shopping cart security system 100 (hereinafter invention) is configured for use with a hand propelled vehicle known as a shopping cart. The invention 100 is a wheeled structure that allows the hand propelled vehicle to roll over a supporting surface. The invention 100: a) determines the GPS coordinates of the invention 100; b) compares the GPS coordinates of the invention 100 with a previously determined set of GPS coordinates that determine an operating perimeter for the invention 100; and, c) disables the rotation of the wheeled structure that forms the invention 100 when the invention 100 is determined to be outside of the region bounded by the previously determined operating perimeter. The invention 100 comprises a caster 101 and a control circuit 102. The control circuit 102 mounts in the caster 101.

The caster 101 is a rotating structure. The caster 101 is defined elsewhere in this disclosure. The caster 101 attaches to the shopping cart such that the caster 101 allows the shopping cart to roll over a supporting surface. The caster 101 is a locking structure. By locking structure is meant that the rotation of the caster 101 can be inhibited by the control circuit 102 when the control circuit 102 determines that the caster 101 is outside of the operating region defined by the previously determined operating perimeter. The caster 101 comprises a stem 111, a swivel bearing 112, a swivel mount 113, a wheel 114, and a locking mechanism 115.

The swivel bearing 112 is a rolling element bearing. The terms bearing and rolling element bearing are defined elsewhere in this disclosure. The swivel bearing 112 attaches the stem 111 to the swivel mount 113 such that the swivel mount 113 rotates relative to the stem 111. The stem 111 physically attaches the swivel bearing 112, the swivel mount 113, and the wheel 114 to a shopping cart. The swivel mount 113 is a mechanical structure that secures the wheel 114 to the balance of the caster 101.

The wheel 114 is a rotating structure that allows the shopping cart to roll over a supporting surface. The wheel 114 attaches to the swivel mount 113 such that the wheel 114 rotates freely within the swivel mount 113. The direction of the axis of rotation of the wheel 114 is perpendicular to the direction of the axis of rotation of the swivel mount 113. The stem 111, the swivel bearing 112, the swivel mount 113, and the wheel 114 are defined elsewhere in this disclosure.

The locking mechanism 115 is a mechanical device that mounts in the caster 101. The locking mechanism 115 inhibits the rotation of the wheel 114 within the caster 101. The locking mechanism 115 inhibits the ability of the shopping cart to roll over the supporting surface. The locking mechanism 115 is an electronic lock. The electronic lock is defined elsewhere in this disclosure.

The control circuit 102 electrically controls the operation of the locking mechanism 115.

The control circuit 102 is an electric circuit. The control circuit 102 attaches to the caster 101. The control circuit 102 determines the GPS coordinates of the control circuit 102. The control circuit 102 compares the GPS coordinates of the control circuit 102 with a previously determined set of GPS coordinates that define the operating perimeter of an operating region. The control circuit 102 disables the rotation of the caster 101 when the control circuit 102 determines that the control circuit 102 is outside of the operating region defined by the previously determined operating perimeter. The control circuit 102 is an independently powered electric circuit. By independently powered is meant that the control circuit 102 can operate without an electrical connection to an external power source. The control circuit 102 comprises a logic module 121, a GPS module 122, an illumination device 123, and a power circuit 124. The logic module 121, the GPS module 122, the illumination device 123, and the power circuit 124 are electrically connected.

The logic module 121 provides the electric energy and the control signals necessary to operate the illumination device 123. The logic module 121 provides the electric energy and the control signals necessary to operate the locking mechanism 115. The logic module 121 further comprises an illumination signal 131.

The illumination signal 131 is an electric signal that is generated by the logic module 121. The illumination signal 131 transmits control signals and electric power from the logic module 121 to the illumination device 123. The illumination signal 131 transmits control signals and electric power from the logic module 121 to the locking mechanism 115.

The GPS module 122 is an electrical device that communicates with the GPS to determine the GPS coordinates of the GPS module 122. When queried by the logic module 121, the GPS module 122 transfers the GPS coordinates to the logic module 121.

The illumination device 123 is an electric circuit. The logic module 121 controls the operation of the illumination device 123. The illumination device 123 mounts in the wheel 114 of the caster 101. The logic module 121 activates the illumination device 123 to visibly illuminate the wheel 114 of the caster 101. The logic module 121 activates the illumination device 123 when the logic module 121 determines that the control circuit 102 is outside of the operating region defined by the previously determined operating perimeter. The logic module 121 activates the locking mechanism 115 to mechanically inhibit the rotation of the wheel 114 of the caster 101. The logic module 121 activates the locking mechanism 115 when the logic module 121 determines that the control circuit 102 is outside of the operating region defined by the previously determined operating perimeter.

The illumination device 123 further comprises a plurality of LEDs 141, a slip ring 142, and a limit resistor 143. The limit resistor 143 electrically connects the plurality of LEDs 141 to the slip ring 142.

Each of the plurality of LEDs 141 is a two terminal semiconducting device. Each of the plurality of LEDs 141 generates a portion of the illumination of the illumination device 123. The plurality of LEDs 141 electrically connect in series with the limit resistor 143 and the slip ring 142.

The slip ring 142 is an electric device. The slip ring 142 is defined elsewhere in this disclosure. The slip ring 142 forms an electric connection between the logic module 121 in the swivel mount 113 and the illumination device 123 in the wheel 114 such that a secure electrical connection between the logic module 121 and the illumination device 123 when the wheel 114 is rotating. The slip ring 142 forms an electric connection between the logic module 121 in the swivel mount 113 and the locking mechanism 115 in the wheel 114 such that a secure electrical connection between the logic module 121 and the locking mechanism 115 when the wheel 114 is rotating.

The limit resistor 143 is an electric device. The limit resistor 143 forms a series electric connection between the slip ring 142 and the plurality of LEDs 141. The limit resistor 143 limits the flow of electric current through the plurality of LEDs 141.

The LED, the slip ring 142, and the limit resistor 143 are defined elsewhere in this disclosure.

The power circuit 124 is an electrical circuit. The power circuit 124 powers the operation of the control circuit 102. The power circuit 124 is an electrochemical device. The power circuit 124 converts chemical potential energy into the electrical energy required to power the control circuit 102. The power circuit 124 comprises a battery 151, a diode 152, and a photovoltaic cell 153. The battery 151, the diode 152, and the photovoltaic cell 153 are electrically connected. The battery 151 is further defined with a first positive terminal .161 and a first negative terminal 171. The photovoltaic cell 153 is further defined with a second positive terminal 162 and a second negative terminal 172.

The battery 151 is an electrochemical device. The battery 151 converts chemical potential energy into the electrical energy used to power the control circuit 102. The battery 151 is a commercially available rechargeable battery 151. The photovoltaic cell 153 is an electrical device that converts light into electrical energy. The chemical energy stored within the rechargeable battery 151 is further renewed and restored through the use of the photovoltaic cell 153.

The photovoltaic cell 153 is directly wired to the battery 151. The photovoltaic cell 153 is an electrical circuit that reverses the polarity of the rechargeable battery 151 and provides the energy necessary to reverse the chemical processes that the rechargeable battery 151 initially used to generate the electrical energy. This reversal of the chemical process creates a chemical potential energy that will later be used by the rechargeable battery 151 to generate electricity.

The diode 152 is an electrical device that allows current to flow in only one direction. The diode 152 installs between the rechargeable battery 151 and the photovoltaic cell 153 such that electricity will not flow from the first positive terminal 161 of the rechargeable battery 151 into the second positive terminal 162 of the photovoltaic cell 153. The photovoltaic cell 153 is defined elsewhere in this disclosure.

The following definitions were used in this disclosure:

Battery: As used in this disclosure, a battery is a chemical device consisting of one or more cells, in which chemical energy is converted into electricity and used as a source of power. Batteries are commonly defined with a positive terminal and a negative terminal.

Bearing: As used in this disclosure, a bearing is a mechanical device that: 1) guides and limits the motion of a moving component relative to a fixed component; and, 2) reduces the friction between the moving component and the fixed component. The use of bearings is well known and documented in the mechanical arts.

Cart: As used in this disclosure, a cart is small vehicle intended to be moved by a person. A synonym for cart is hand cart.

Caster: As used in this disclosure, a caster is a wheel that is mounted on a swivel that allows the wheel to adjust, or swivel, the direction of rotation of the wheel to the direction of motion desired for the wheel. The generic parts of a caster are called the stem, the swivel bearing, the swivel mount, and the wheel. The swivel bearing attaches the stem to the swivel mount such that the swivel mount will rotate relative to the stem. The wheel attaches to the swivel mount such that the wheel freely rotates relative to the swivel mount. The direction of the axis of rotation of the wheel is perpendicular to the direction of the axis of rotation of the swivel mount. The stem attaches the swivel bearing, the swivel mount, and the wheel to an externally provided object.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Center of Rotation: As used in this disclosure, the center of rotation is the point of a rotating plane that does not move with the rotation of the plane. A line within a rotating three-dimensional object that does not move with the rotation of the object is also referred to as an axis of rotation.

Control Circuit: As used in this disclosure, a control circuit is an electrical circuit that manages and regulates the behavior or operation of a device.

Diode: As used in this disclosure, a diode is a two terminal semiconductor device that allows current flow in only one direction. The two terminals are called the anode and the cathode. Electric current is allowed to pass from the anode to the cathode.

Electronic Lock: As used in this disclosure, an electronic lock is an electromechanically operated lock that: 1) mechanically locks an object; and, 2) is secured and released using an electrical or electronically driven mechanism.

External Power Source: As used in this disclosure, an external power source is a source of the energy that is externally provided to enable the operation of the present disclosure. Examples of external power sources include, but are not limited to, electrical power sources and compressed air sources.

GPS: As used in this disclosure, and depending on the context, GPS refers to: 1) a system of navigational satellites that are used to determine the position, known as GPS coordinates, and velocity of a person or object; 2) the system of navigational satellites referred to in the first definition that are used to synchronize to global time; or, 3) an electronic device or that uses the system of navigational satellites referred to in the first definition to determine the position of a person or object. GPS is an acronym for Global Positioning System. Methods to determine the distance and direction between any two sets of GPS coordinates are well-known and documented in the navigational arts.

LED: As used in this disclosure, an LED is an acronym for a light emitting diode. A light emitting diode is a diode that is also a light source.

Limit Resistor: As used in this disclosure, a limit resistor is an electrical resistor that is used to limit the flow of electric current through an electrical circuit.

Lock: As used in this disclosure, a lock is a fastening device that secures a rotating mechanical device into a fixed position.

Logic Module: As used in this disclosure, a logic module is a readily and commercially available electrical device that accepts digital and analog inputs, processes the digital and analog inputs according to previously specified logical processes and provides the results of these previously specified logical processes as digital or analog outputs. The disclosure allows, but does not assume, that the logic module is programmable.

Perimeter: As used in this disclosure, a perimeter is one or more curved or straight lines that bounds an enclosed area on a plane or surface. The perimeter of a circle is commonly referred to as a circumference.

Plug: As used in this disclosure, a plug is an electrical termination that electrically connects a first electrical circuit to a second electrical circuit or a source of electricity. As used in this disclosure, a plug will have two or three metal pins.

Photoelectric: As used in this disclosure, photoelectric is an adjective used to describe an electronic component in which the performance of the electronic component is modified by light. Typical photoelectric devices include, but are not limited to, photoelectric transistors, photoelectric diodes, and photoelectric resistors.

Photovoltaic Cell: As used in this disclosure, a photovoltaic cell is a photoelectric device that directly converts light energy into electrical energy.

Port: As used in this disclosure, a port is an electrical termination that is used to connect a first electrical circuit to a second external electrical circuit. In this disclosure, the port is designed to receive a plug.

Resistor: As used in this disclosure, a resistor is a well-known and commonly available electrical device that presents a resistance that inhibits the flow of electricity through an electric circuit. Within an electric circuit processing alternating currents, the resistor will not affect the phase of the alternating current. A current flowing through a resistor will create a voltage across the terminals of the resistor.

Rolling Element Bearing: As used in this disclosure, a rolling element bearing comprises is a type of bearing comprising an inner race, and outer race, and a plurality of ball bearings. The plurality of ball bearings are sphere shaped. The inner race is a circular ring. The outer race is a circular ring with an inner diameter that is greater than the outer diameter of the inner race. The plurality of ball bearings are placed between the inner race and the outer race such that: 1) the inner race and the outer race are coaxially positioned; and, 2) the inner race rotates relative to the outer race. Typically, the inner race attaches to a first object and the outer race attaches to a second object such that the first object rotates relative to the second object. Typically, a rolling element bearing is disk shaped. A rolling element bearing is said to be "locking" when the relative position of the inner race in be locked into a fixed position relative to the outer race. Rolling element bearings, including locking versions, are: 1) commercially available; and, 2) well-known and documented in the mechanical arts.

Slip Ring: As used in this disclosure, a slip ring is an electrical device that forms an electrical connection between a stationary object and a rotating object.

Supporting Surface: As used in this disclosure, a supporting surface is a horizontal surface upon which an object is placed and to which the load of the object is transferred. This disclosure assumes that an object placed on the supporting surface is in an orientation that is appropriate for the normal or anticipated use of the object.

Swivel: As used in this disclosure, a swivel is a fastening structure that attaches a first object to a second object such that will rotate around an axis of rotation while the second object remains in a fixed position relative to the first object.

Vehicle: As used in this disclosure, a vehicle is a device that is used for transporting passengers, goods, or equipment. The term motorized vehicle specifically refers to a vehicle can move under power provided by an electric motor or an internal combustion engine. The term vehicle generically applies to motorized vehicles and vehicles without a motor.

Wheel: As used in this disclosure, a wheel is a circular object that revolves around an axle or an axis and is fixed below an object to enable it to move easily over the ground. For the purpose of this disclosure, it is assumed that a wheel can only revolve in a forward and a backward direction. Wheels are often further defined with a rim and spokes. Spokes are also commonly referred to as a wheel disk.

With respect to the above description, it is to be realized that the optimum dimensional relationship for the various components of the invention described above and in FIGS. 1 through 7 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A shopping cart security system comprising a caster and a control circuit;
wherein the control circuit mounts in the caster;
wherein the hand propelled vehicle security system is configured for use with a hand propelled vehicle;
wherein the hand propelled vehicle security system is a wheeled structure that allows the hand propelled vehicle to roll over a supporting surface;
wherein the hand propelled vehicle security system: a) determines the GPS coordinates of the hand propelled vehicle security system; b) compares the GPS coordinates of the hand propelled vehicle security system with a previously determined set of GPS coordinates that determine an operating perimeter for the hand propelled vehicle security system; and, c) disables the rotation of the wheeled structure that forms the hand propelled vehicle security system when the hand propelled vehicle security system is determined to be outside of the region bounded by the previously determined operating perimeter;
wherein the caster comprises a stem, a swivel bearing, a swivel mount, a wheel, and a locking mechanism;
wherein the swivel bearing attaches the stem to the swivel mount such that the swivel mount rotates relative to the stem;
wherein the wheel attaches to the swivel mount such that the wheel rotates freely within the swivel mount;
wherein the stem physically attaches the swivel bearing, the swivel mount, and the wheel to the hand propelled vehicle;
wherein the locking mechanism inhibits the rotation of the wheel within the caster;
wherein the control circuit comprises a logic module, a GPS module, an illumination device, and a power circuit;
wherein the logic module, the GPS module, the illumination device, and the power circuit are electrically connected;
wherein the logic module further comprises an illumination signal;
wherein the illumination signal is an electric signal that is generated by the logic module;
wherein the illumination signal transmits control signals and electric power from the logic module to the illumination device;
wherein the illumination signal transmits control signals and electric power from the logic module to the locking mechanism;
wherein the control circuit electrically controls the operation of the locking mechanism;
wherein the control circuit is an electric circuit;
wherein the control circuit attaches to the caster;
wherein the control circuit determines the GPS coordinates of the control circuit;
wherein the control circuit compares the GPS coordinates of the control circuit with a previously determined set of GPS coordinates that define the operating perimeter of an operating region;
wherein the control circuit disables the rotation of the caster when the control circuit determines that the control circuit is outside of the operating region defined by the previously determined operating perimeter;
wherein the GPS module is an electrical device that communicates with the GPS to determine the GPS coordinates of the GPS module;

wherein the GPS module transfers the GPS coordinates to the logic module;
wherein the illumination device is an electric circuit;
wherein the logic module controls the operation of the illumination device;
wherein the illumination device mounts in the wheel of the caster.

2. The hand propelled vehicle security system according to claim 1
wherein the caster is a rotating structure;
wherein the caster attaches to the hand propelled vehicle such that the caster allows the hand propelled vehicle to roll over a supporting surface.

3. The hand propelled vehicle security system according to claim 2
wherein the caster is a locking structure;
wherein by locking structure is meant that the rotation of the caster can be inhibited by the control circuit when the control circuit determines that the caster is outside of the operating region defined by the previously determined operating perimeter.

4. The hand propelled vehicle security system according to claim 3
wherein the control circuit is an independently powered electric circuit;
wherein by independently powered is meant that the control circuit can operate without an electrical connection to an external power source.

5. The hand propelled vehicle security system according to claim 4
wherein the wheel is a rotating structure;
wherein the direction of the axis of rotation of the wheel is perpendicular to the direction of the axis of rotation of the swivel mount.

6. The hand propelled vehicle security system according to claim 5
wherein the locking mechanism is a mechanical device;
wherein the locking mechanism inhibits the ability of the hand propelled vehicle to roll over the supporting surface;
wherein the locking mechanism is an electronic lock.

7. The hand propelled vehicle security system according to claim 6
wherein the logic module provides the electric energy and the control signals necessary to operate the illumination device;
wherein the logic module provides the electric energy and the control signals necessary to operate the locking mechanism.

8. The hand propelled vehicle security system according to claim 7
wherein the logic module activates the illumination device to visibly illuminate the wheel of the caster;
wherein the logic module activates the illumination device when the logic module determines that the control circuit is outside of the operating region defined by the previously determined operating perimeter.

9. The hand propelled vehicle security system according to claim 8
wherein the logic module activates the locking mechanism to mechanically inhibit the rotation of the wheel of the caster;
wherein the logic module activates the locking mechanism when the logic module determines that the control circuit is outside of the operating region defined by the previously determined operating perimeter.

10. The hand propelled vehicle security system according to claim 9
wherein the illumination device further comprises a plurality of LEDs, a slip ring, and a limit resistor;
wherein the limit resistor electrically connects the plurality of LEDs to the slip ring.

11. The hand propelled vehicle security system according to claim 10
wherein each of the plurality of LEDs is a two terminal semiconducting device;
wherein each of the plurality of LEDs generates a portion of the illumination from the illumination device;
wherein the plurality of LEDs electrically connect in series with the limit resistor and the slip ring;
wherein the slip ring is an electric device;
wherein the slip ring forms an electric connection between the logic module in the swivel mount and the illumination device in the wheel such that a secure electrical connection between the logic module and the illumination device when the wheel is rotating;
wherein the slip ring forms an electric connection between the logic module in the swivel mount and the locking mechanism in the wheel such that a secure electrical connection between the logic module and the locking mechanism when the wheel is rotating;
wherein the limit resistor is an electric device;
wherein the limit resistor forms a series electric connection between the slip ring and the plurality of LEDs;
wherein the limit resistor limits the flow of electric current through the plurality of LEDs.

12. The hand propelled vehicle security system according to claim 11
wherein the power circuit is an electrical circuit;
wherein the power circuit powers the operation of the control circuit;
wherein the power circuit is an electrochemical device;
wherein the power circuit comprises a battery, a diode, and a photovoltaic cell;
wherein the battery, the diode, and the photovoltaic cell are electrically connected;
wherein the battery is further defined with a first positive terminal and a first negative terminal;
wherein the photovoltaic cell is further defined with a second positive terminal and a second negative terminal.

13. The hand propelled vehicle security system according to claim 12
wherein the battery is a rechargeable battery;
wherein the photovoltaic cell is an electrical device that converts light into electrical energy;
wherein the photovoltaic cell is directly wired to the battery.

14. The hand propelled vehicle security system according to claim 13
wherein the diode is an electrical device that allows current to flow in only one direction;
wherein the diode installs between the rechargeable battery and the photovoltaic cell such that electricity will not flow from the first positive terminal of the rechargeable battery into the second positive terminal of the photovoltaic cell.

* * * * *